United States Patent
Krause

(10) Patent No.: US 10,442,281 B2
(45) Date of Patent: Oct. 15, 2019

(54) WINDOW ASSEMBLY, WINDOW PANE, AND WINDOW GUIDING PROFILE

(71) Applicant: COOPER STANDARD GMBH, Lindau/Bodensee (DE)

(72) Inventor: Fritz Krause, Hergatz (DE)

(73) Assignee: COOPER STANDARD GMBH, Lindau/Bodensee (DE)

( * ) Notice: Subject to any disclaimer, the term of this patent is extended or adjusted under 35 U.S.C. 154(b) by 0 days.

(21) Appl. No.: 15/773,117

(22) PCT Filed: Jan. 18, 2016

(86) PCT No.: PCT/EP2016/050912
§ 371 (c)(1),
(2) Date: May 2, 2018

(87) PCT Pub. No.: WO2017/076511
PCT Pub. Date: May 11, 2017

(65) Prior Publication Data
US 2018/0319261 A1    Nov. 8, 2018

(30) Foreign Application Priority Data
Nov. 2, 2015  (EP) .................................. 15192614

(51) Int. Cl.
*E05F 1/00*      (2006.01)
*B60J 10/79*    (2016.01)
(Continued)

(52) U.S. Cl.
CPC .............. *B60J 10/79* (2016.02); *B60J 1/008* (2013.01); *B60J 1/17* (2013.01); *B60J 5/0402* (2013.01); *B60J 10/27* (2016.02); *B60J 10/76* (2016.02)

(58) Field of Classification Search
CPC ... B60J 10/79; B60J 10/27; B60J 10/76; B60J 1/17; B60J 1/008; B60J 5/0402
(Continued)

(56) References Cited

U.S. PATENT DOCUMENTS 4,240,227 A * 12/1980 Hasler ...................... B60J 10/79
49/348
4,418,498 A * 12/1983 Wanlass ................ E05F 11/382
49/348
(Continued)

FOREIGN PATENT DOCUMENTS

DE    10 2004 063 509 A1    7/2006
DE    10 2014 005 721 B3    8/2015
(Continued)

OTHER PUBLICATIONS

PCT/EP2016/050912 International Search Report and Written Opinion, Prepared by the European Patent Office, dated Jul. 28, 2016.

*Primary Examiner* — Jerry E Redman
(74) *Attorney, Agent, or Firm* — Fay Sharpe LLP

(57) ABSTRACT

A window assembly (150) of a side window opening of a motor vehicle comprises a door frame member (22) having an outer surface (26), a movable window pane (130) having an outer window surface (132) and a guiding member (140), and a window guiding profile (100). The window guiding profile (100) is fastened to the door frame member (22) and guides the window pane (130) along a direction of movement between an open position and a closed position. The window guiding profile (100) includes a sealing portion (105) for sealing the window pane (130), an accommodating opening (104), and a guiding leg (101). The guiding leg (101) comprises a locating member (110) which cooperates with the guiding member (140) to prevent a movement of the window pane (130) out of the accommodating opening (104).

13 Claims, 7 Drawing Sheets

(51) Int. Cl.
*B60J 1/00* (2006.01)
*B60J 1/17* (2006.01)
*B60J 5/04* (2006.01)
*B60J 10/76* (2016.01)
*B60J 10/27* (2016.01)

(58) Field of Classification Search
USPC .......................... 49/440, 441, 490.1, 495.1
See application file for complete search history.

(56) References Cited

U.S. PATENT DOCUMENTS

| | | | | |
|---|---|---|---|---|
| 4,483,100 A * | 11/1984 | Blankenburg | ........ | E05F 11/426 49/352 |
| 4,490,942 A * | 1/1985 | Arnheim | ................. | B60J 10/24 49/374 |
| 4,567,691 A * | 2/1986 | Warner | ................... | B60J 10/79 49/374 |
| 4,581,851 A * | 4/1986 | Warner | ................. | B60J 10/248 428/122 |
| 4,604,830 A * | 8/1986 | Maeda | ................... | B60J 10/248 49/374 |
| 4,608,779 A * | 9/1986 | Maeda | ................... | B60J 10/248 428/122 |
| 4,611,435 A * | 9/1986 | Warner | ................... | B60J 10/79 49/374 |
| 4,621,453 A * | 11/1986 | Watanabe | ............... | B60J 10/79 49/227 |
| 4,625,459 A * | 12/1986 | Warner | ................. | B60J 10/235 49/489.1 |
| 4,628,637 A * | 12/1986 | Okada | ..................... | B60J 10/79 49/374 |
| 4,631,865 A * | 12/1986 | Motonami | ............... | B60J 10/79 49/374 |
| 4,653,230 A * | 3/1987 | Seo | ......................... | B60J 10/79 49/227 |
| 4,662,113 A * | 5/1987 | Weaver | ............ | B29C 45/14377 49/404 |
| 4,697,386 A * | 10/1987 | Watanabe | ................ | B60J 10/79 49/374 |
| 4,823,511 A * | 4/1989 | Herliczek | ................ | B60J 10/74 428/83 |
| 4,874,201 A * | 10/1989 | Scaglietti | ................. | B60J 10/24 296/201 |
| 4,875,307 A * | 10/1989 | Barbero | ................... | B60J 10/24 49/374 |
| 4,903,436 A * | 2/1990 | Rouillard | ................. | B60J 10/79 49/440 |
| 4,932,161 A * | 6/1990 | Keys | ........................ | B60J 10/24 49/374 |
| 5,013,379 A * | 5/1991 | Brooks | .................. | B32B 25/08 156/244.11 |
| 5,040,333 A | 8/1991 | Mesnel | | |
| 5,054,242 A * | 10/1991 | Keys | ........................ | B60J 10/24 49/374 |
| 5,086,589 A * | 2/1992 | dibenedetto | ........... | B60J 5/0402 296/146.3 |
| 5,613,325 A * | 3/1997 | Mariel | .............. | B32B 17/10036 49/374 |
| 6,141,910 A * | 11/2000 | Kobrehel | ............... | B60J 5/0402 49/348 |
| 8,434,267 B2 * | 5/2013 | Bocutto | ................. | B60J 10/235 296/93 |
| 8,561,353 B2 * | 10/2013 | Terai | ....................... | B60J 1/007 49/440 |
| 8,561,354 B2 * | 10/2013 | Grudzinski | ........... | E05F 11/382 49/441 |
| 8,572,898 B2 * | 11/2013 | Grudzinski | ............ | B60J 5/0402 49/441 |
| 8,650,802 B2 * | 2/2014 | Grudzinski | ............ | B60J 5/0402 49/441 |
| 8,701,349 B2 | 4/2014 | Krause | | |
| 9,925,850 B2 * | 3/2018 | Yoshida | ................... | B60J 1/004 |
| 9,944,159 B2 * | 4/2018 | Dosaki | .................... | B60J 10/76 |
| 10,167,659 B2 * | 1/2019 | Sagisaka | .................... | B60J 1/17 |
| 2005/0229496 A1 | 10/2005 | Tashima et al. | | |
| 2006/0021282 A1* | 2/2006 | Tamaoki | ................... | B60J 10/74 49/441 |
| 2006/0059799 A1* | 3/2006 | Zimmer | .................... | B60J 1/08 52/204.1 |
| 2009/0309391 A1* | 12/2009 | Krause | .................... | B60J 10/79 296/201 |
| 2012/0025564 A1 | 2/2012 | Ellis et al. | | |

FOREIGN PATENT DOCUMENTS

EP 1 630 024 A1 3/2006
EP 1 794 402 B1 6/2010
FR 2 949 501 B1 2/2014

* cited by examiner

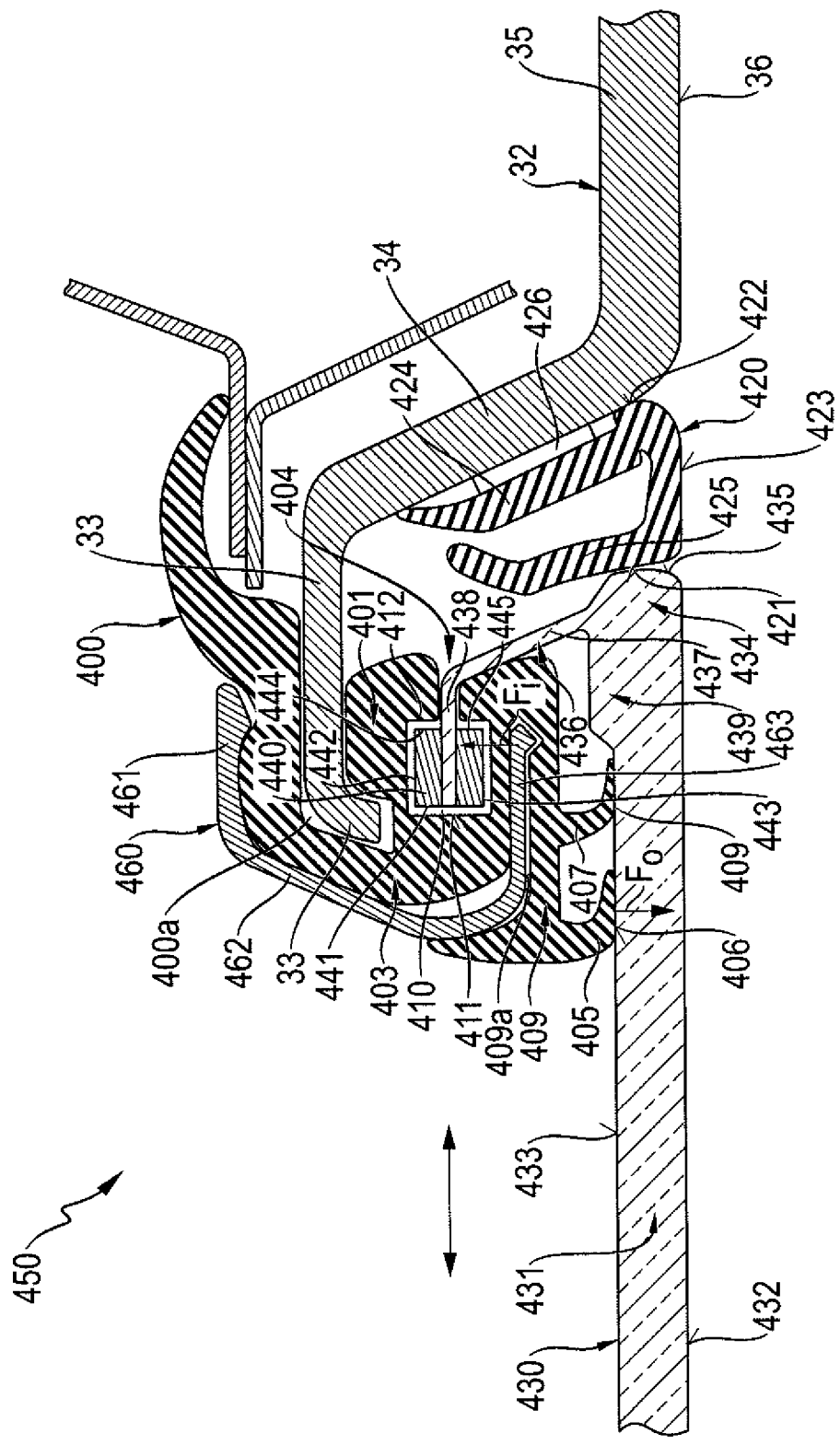

WINDOW ASSEMBLY, WINDOW PANE, AND WINDOW GUIDING PROFILE

CROSS REFERENCE TO RELATED APPLICATIONS

This application is the national entry filing of PCT/EP2016/050912 (filed 18 Jan. 2016) as a submission under 35 U.S.C. 371, hereby expressly incorporated herein by reference, and also claims the priority benefit of EP Application Serial No. 15192614.4, filed 2 Nov. 2015, which is also hereby expressly incorporated herein by reference.

BACKGROUND

The invention generally relates to a window assembly for a motor vehicle. Furthermore, the invention relates to a window pane and a window guiding profile.

In recent years design aspects of motor vehicles have become more important. Yet, from today's perspective also environmental topics are an additional factor to be considered in the development of motor vehicles. Although just in its beginning stages, the electrification of motor vehicles in the near future is posing new challenges regarding, for instance, energy supply, energy storage, and energy consumption. Therefore, there is a constant demand from car manufacturers and their suppliers for solutions to these challenges.

As used herein, terms defining directions or positions, such as "left", "right", "front", "rear", "top", "bottom", "inner", "outer", and the like are referring to a view of a motor vehicle from one of the seats. For example, the B pillar is to the rear of the A pillar but to the front of the C pillar. Directions or positions of components are typically designated according to their installed positions. It should further be noted that the term "pillar" as used herein is not limited to the usual load bearing pillar of a motor vehicle. The term "pillar" should rather be construed to further include portions of the motor vehicle in the vicinity of the actual load bearing pillars where accommodating and guiding of the window pane takes place.

EP 2 142 394 B1 discloses a guide arrangement for a movable window pane of a motor vehicle. The guide arrangement includes a first movable window pane, and a second movable window pane. The end face of the first window pane and the end face of the second window pane are arranged opposite, and at a distance from, one another. A first guide part is fastened to the first window pane. A second guide part is fastened to the second window pane. Furthermore, a first receptacle for the first guide part, and a second receptacle for the second guide part are provided.

EP 1 94 402 B1 discloses a division bar assembly to be received between an associated fixed window and an associated movable window of a vehicle. The division bar assembly comprises a support adapted to be secured to the associated fixed window, a guide adapted to be affixed to the associated movable window and adapted to extend from an inner surface thereof, and a guide member extending from the support including a cavity dimensioned to receive the guide.

US 2012/0025584 A1 discloses a flush glass system module for a motor vehicle door frame defining a window opening having an upper edge and a lower edge for receiving a window having an inner surface. The flush glass system module comprises a front slider adapted to mount to the inner surface of the window. The first appliqué is disposed entirely on the inner surface side of the window.

DE 10 2005 013 581 B4 discloses a structure of a door window frame of a vehicle having a portion for holding a door window pane. A window pane seal is provided at one end portion of the door window pane. An outer surface of the window seal, an outer surface of the door window pane and an outer surface of an outer wall of the door window frame are flush on the outer side of the vehicle.

DE 10 2014 005 721 B3 discloses a window pane arrangement for a motor vehicle having a window pane. The window pane arrangement comprises a front guiding rail and a rear guiding rail. The window pane is guided in the front guiding rail and the rear guiding rail. At least one of the guiding rails is configured as two-parts having a guiding member and a closure member connected to the guiding member. The guiding member and the closure member define between them a channel for receiving the window pane. The guiding member and the closure member are connected by means of a form-fitting connection.

EP 1 630 024 A1 discloses an ascending and descending door glass supporting structure having a sash, a run channel provided in the sash for guiding a door glass, and a slider provided at a front edge or a rear edge of the door glass. An inner first lip, an inner second lip and an inner third lip formed on the run channel are directed toward a bottom of the run channel, facilitating assemblage of the door glass. The slider has a hook-shaped portion for hooking the inner second lip. Thus, the door glass is unlikely to escape and is reliably held.

EP 0 083 696 A2 discloses a window pane for motor vehicles. The window pane is arranged flush with the neighboring chassis portions. This allows the sealing to directly contact the window pane. Furthermore, a tolerance compensation along the longitudinal direction and lateral relative to the frame of the window pane may be achieved.

U.S. Pat. No. 5,040,333 A refers to a movable flush-glass system for an automobile door comprising two metal panels which are fixed to one another and between which this movable glass can be retracted. A glass frame is obtained from the said panels or fixed to these. The glass frame defines with the panels an aperture intended to be closed off by the movable glass and comprises, on the sides of the aperture other than that on which the glass can be retracted between the panels, a rebate projecting in the direction of the aperture. On the inner face of the pane there is a guide element capable of capping an elastomeric section which caps the rebate.

DE 10 2004 063 509 A1 discloses a window structure for a vehicle. The window structure comprises a window pane having an outer edge and a window frame. The outer edge of the window pane is designed to provide a form-fit connection with the window frame.

FR 2 949 501 A1 discloses a window pane which has guide rails for guiding the window pane during its sliding. The guide rails include a connection branch connected to the window pane and include a leg that is arranged parallel or near an edge of the window pane.

BRIEF SUMMARY

The invention is based on the object to provide a smooth transition from the rim portions of a window pane to the neighboring portions of the vehicle.

The object is achieved by a window assembly according to claim 1. Advantageous embodiments of the window assembly are subject-matter of claims 2 to 11. A window guiding profile of the window assembly is subject-matter of claim 12.

The invention provides a window assembly for a window opening, in particular a side window opening, of a motor vehicle having a front-rear direction. The window assembly comprises a door frame member, a movable window pane, and a window guiding profile. The door frame member has an outer surface. A front pillar or a rear pillar are an example for a door frame member, respectively. The movable window pane has an outer window surface and a guiding means for guiding the window pane. The window guiding profile is fastened to the door frame member, and being configured to guide the window pane along a direction of movement between an open position and a closed position. The window guiding profile includes a sealing portion being configured to seal the window pane and an accommodating opening being configured to accommodate the window pane. The window guiding profile further comprises an inner guiding leg, an outer guiding leg comprising a locating means, and a guiding base connecting the inner guiding leg and the outer guiding leg. The accommodating opening extends in an accommodating direction that is parallel to the front-rear direction. The outer guiding leg comprises a bracket leg defining a receiving opening that extends in the opposite direction relative to the accommodating opening. The guiding means and the locating means cooperate to prevent a movement of the window pane out of the accommodating opening along the accommodating direction. Preferably, the guiding means form-fittingly engages the locating means. The locating means may have a sliding surface which, as a contact surface, is preferably coated with a lubricant material like lubricant varnish or flock. Alternatively or additionally, the locating means can be formed, in particular co-extruded from a lubricant material like polyethylene. With this configuration a smooth surface of the motor vehicle is possible. In particular the transition between the window pane and the door frame member, such as a front pillar or a rear pillar can be achieved. The locating means provides a reliable guiding for the window pane and prevents movement of the window pane out of the accommodating opening.

Preferably, the window guiding profile contacts and accommodates the window pane in such a way, that the outer surface and the outer window surface are arranged to be flush.

In an embodiment, the sealing portion engages the window pane so as to press the window pane towards the locating means. Alternatively or additionally, the sealing portion is configured to apply a torque to the window pane so as to press the window pane towards the locating means. By pressing the window pane towards the locating means, the risk for the window pane to lose contact with the guiding leg can be reduced. The risk can be reduced even further, when a torque is applied to the window pane so as to press the window pane towards the locating means even further.

Advantageously, the sealing portion comprises a sealing lip. The sealing lip is preferably disposed at the outer guiding leg. The sealing lip may extend into the accommodating opening. The sealing lip can protrude outward from the outer guiding leg. Preferably, the sealing lip is disposed at the end of the outer guiding leg. The sealing lip may engage the window pane. The sealing lip preferably presses the window pane towards the locating means. The sealing lip is advantageously disposed in such a way, in particular relative to an intermediate sealing member and/or the locating means, that a torque is applied to the window pane so as to press the window pane towards the locating means. The sealing portion may comprise a pressing lip. The pressing lip is preferably disposed at the outer guiding leg. The pressing lip may extend into the accommodating opening and towards the locating means. The pressing lip can protrude outward from the outer guiding leg and away from the locating means. The pressing lip may engage the window pane. The pressing lip can press the window pane towards the locating means. The pressing lip may be disposed in such a way, in particular relative to an intermediate sealing member, that a torque is applied to the window pane so as to press the window pane towards the locating means. The sealing lip and/or the pressing lip may be coated with a lubricant material, like lubricant varnish or flock. With this configuration, a moisture seal and an acoustic seal can be provided. As described before, the pressing of the window pane towards the locating means reduces the risk of malfunction. In this configuration the intermediate sealing member applies a force which is, for example, directed opposite to a force applied by the pressing lip and/or the sealing lip. When arranged correctly, an instantaneous center of rotation can be achieved about which the window pane is virtually rotating into the locating means.

The sealing portion may comprise an intermediate sealing member. The intermediate sealing member can be a separate member. The intermediate sealing member can be disposed at the end of the inner guiding leg. The intermediate sealing member can be spaced apart from the pressing lip along the accommodating direction. In an embodiment, the intermediate sealing member is interposed along the accommodating direction between the locating means and the door frame member. The intermediate sealing member may be spaced apart from the locating means along the accommodating direction. The intermediate sealing member can comprise a counter-pressing lip. The counter-pressing lip preferably extends into the accommodating opening, and is in particular spaced apart from the locating means and/or the pressing lip along the accommodating direction. The intermediate sealing member can include a front contact surface, a rear contact surface, and an exposed surface interposed along the accommodating direction between the front contact surface and the rear contact surface. The exposed surface is preferably arranged to be flush with the outer surface and the outer window surface. Additionally or alternatively, the exposed surface is arranged to be flush with the outer surface and the outer window surface. The intermediate sealing member, in particular any of the front contact surface, the rear contact surface, and the exposed surface may be coated with a lubricant material like lubricant varnish or flock. Preferably, the locating means is disposed so as to face the pressing lip. The locating means can be disposed adjacent to the intermediate sealing member along the accommodating direction. Particularly, the locating means is disposed adjacent to the counter-pressing lip along the accommodating direction. Advantageously, the sealing portion comprises a bottom lip. The bottom lip is preferably disposed at the guiding leg. The bottom lip may extend into the accommodating opening. Preferably, the pressing lip is interposed along the accommodating direction between the sealing lip and the bottom lip. With this configuration, the flow force on the window pane can be defined more specifically in order to further reduce the risk of the window pane to move out of the accommodating opening. The bottom lip can further enhance the sealing properties, in particular regarding moisture and noise.

The sealing portion preferably comprises at least one contact surface. The contact surfaces can be suitably coated with a lubricant material, like varnish, or flock, e.g. made from polyamide fibers or polyester fibers, or can be formed, in particular by co-extrusion, from a lubricant material, like polyester, respectively.

The inner guiding leg, the outer guiding leg, and the guiding base may be arranged in a U-like or a C-like shape. The sealing lip is preferably disposed at the inner guiding leg or at the outer guiding leg. The pressing lip is preferably disposed at the end of the same guiding leg as the sealing lip. In particular the pressing lip is disposed at the end of the inner guiding leg or at the end of the outer guiding leg. The pressing lip may be interposed along the accommodating direction between the sealing lip and the guiding base. The intermediate sealing member is advantageously disposed at the end of the outer guiding leg or at the end of the inner guiding leg. The counter-pressing lip may be disposed at the end of the intermediate sealing member along the accommodating direction. The bottom lip is preferably disposed at the same guiding leg as the sealing lip and/or the pressing lip. The bottom lip may be disposed at the inner guiding leg or at the outer guiding leg. The bottom lip can be interposed along the accommodating direction between the guiding base and the pressing lip or between the guiding base and the sealing lip. The locating means may be interposed along the accommodating direction between the guiding base and the intermediate sealing member.

The sealing lip can be disposed at the bracket leg. Preferably, the pressing lip may be disposed at the bracket leg, in particular at the end of the bracket leg. Advantageously, the window guiding profile is formed as a single unitary member, preferably from a thermoplastic elastomer or from an elastomer. With this configuration the flow of force guiding the window pane can be controlled further, so that the risk of a movement of the window pane out of the accommodating opening can be further reduced.

The window assembly further comprises a mounting bracket fastened to the window guiding profile. The mounting bracket serves to reinforce the outer guiding leg. The mounting bracket is preferably received in the receiving opening. Most preferred, the mounting bracket is encompassed by the guiding leg, in particular the outer guiding leg, and the bracket leg. With this configuration, the window guiding profile can be produced from a more flexible material like a thermoplastic elastomer, for example. Consequently, the window guiding profile can be easily installed. In the installed state, the mounting bracket fastens the window guiding profile to the motor vehicle. The mounting bracket can also provide the necessary stiffness to the window guiding profile which allows a secure guiding of the window pane. Additionally, the mounting bracket may serve as a trimming portion for the vehicle interior. The mounting bracket is preferably integrally formed as a single unitary member using a thermoplastic or a metal like aluminium.

The window pane may comprise a window section and a guiding section which are integrally formed as a single unitary member. The window pane is preferably made of a transparent thermoplastic like polycarbonate or polymethyl methacrylate (PMMA), for example. The window pane may further comprise a hard coat. The guiding means is advantageously disposed at the end of the guiding section. The guiding section may include a supporting portion. The guiding section also may comprise a connecting arm connecting the window section and the guiding arm. The guiding section can include a reinforcing member, which is advantageously embedded in the guiding arm and/or the connecting arm. Preferably, the guiding section extends along between 50% and 100%, in particular between 70% and 100%, of a dimension of the window section. With this configuration, the window pane is further adapted to optimize the flow of force in order to further reduce the risk of moving out of the accommodating opening.

The invention further provides a window pane for an advantageous embodiment of a window assembly. The window pane may include any combination of features relating to the window pane as previously described. The window pane preferably comprises a window section, and a guiding section being configured to guide the window pane along a direction of movement between an open position and a closed position. The guiding section may be provided at the front edge, at the rear edge or at both the front edge and the rear edge of the window pane. The guiding section has a guiding means being connected to the window section, and being perpendicularly spaced apart from the window section. The guiding means is configured to cooperate with a locating means of the window assembly. The window section and the guiding section are integrally formed as a single unitary member.

The invention further provides a window guiding profile. The window guiding profile may include any combination of features relating to the window guiding profile as previously described. The window guiding profile is in particular configured to guide a window pane as previously described along a direction of movement between an open position and a closed position for an advantageous embodiment of a window assembly as previously described of a motor vehicle having a door frame member. The window guiding profile comprises a fastening portion being configured to fasten the window guiding profile to the motor vehicle, in particular the door frame member, a sealing portion being configured for sealing the window pane and an accommodating opening. The window guiding profile further comprises an inner guiding leg, an outer guiding leg comprising a locating means, and a guiding base connecting the inner guiding leg and the outer guiding leg. The accommodating opening is configured to accommodate the window pane and extends in an accommodating direction that is parallel to the guiding leg. The outer guiding leg comprises a bracket leg defining a receiving opening that extends in the opposite direction relative to the accommodating opening. The locating means is configured to cooperate with the window pane so as to prevent a movement of the window pane out of the accommodating opening along the accommodating direction. A mounting bracket is fastened to the window guiding profile. The mounting bracket serves to reinforce the outer guiding leg.

The invention further provides a vehicle door comprising any of the previous described advantageous embodiments of a window assembly, a window pane, or a window guiding profile. Still further, the invention provides a vehicle comprising an advantageous embodiment of a vehicle door, a window assembly, a window pane, or a window guiding profile.

BRIEF DESCRIPTION OF THE DRAWINGS

Further details and advantageous effects of the invention will become apparent in the following detailed description with reference to the attached schematic drawings. The figures are listed below:

FIG. 7 depicts a cross-section of a fourth embodiment of a window assembly.

DETAILED DESCRIPTION

Figure 1:
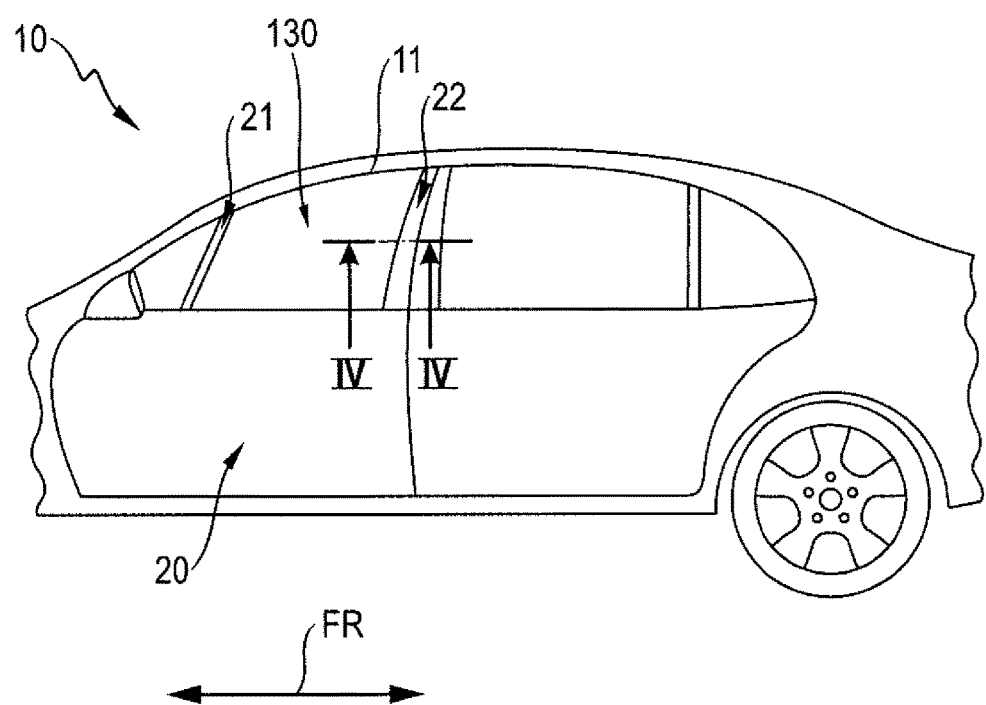
FIG. 1 depicts a partial view of an embodiment of a motor vehicle.

Referring to FIG. 1, a motor vehicle 10 comprises a front-rear direction FR and a side window opening 11 extending along the front-rear direction FR. The motor vehicle 10 further comprises a vehicle door 20 having a front pillar 21 and a rear pillar 22. The front pillar 21 is disposed towards the front of the vehicle door 20, whereas the rear pillar 22 is disposed towards the rear of the vehicle door 20. It should be noted, that the front pillar 21 and the rear pillar 22 need not be a load bearing structure. The front pillar 21 and the rear pillar 22 are an example for a door frame member, respectively.

Figure 2:
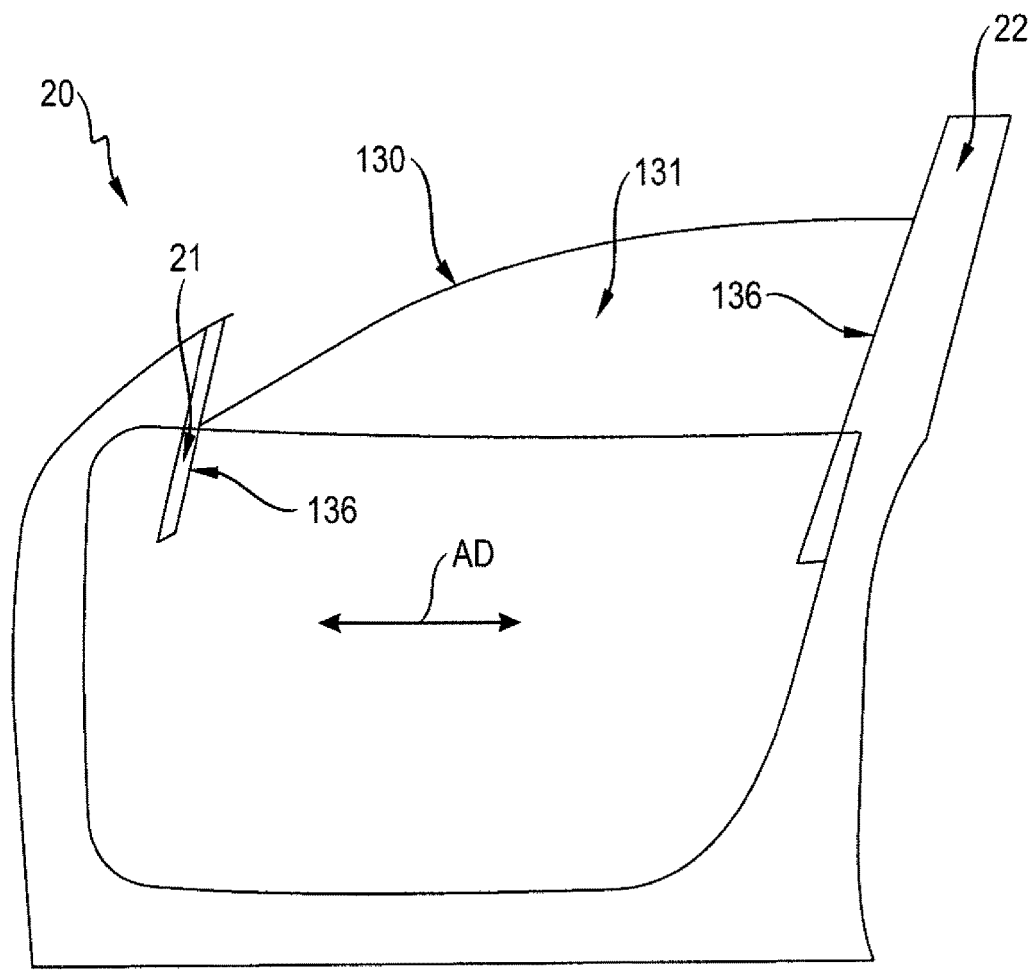
FIG. 2 depicts a schematic view of an embodiment of a vehicle door.
Figure 3:
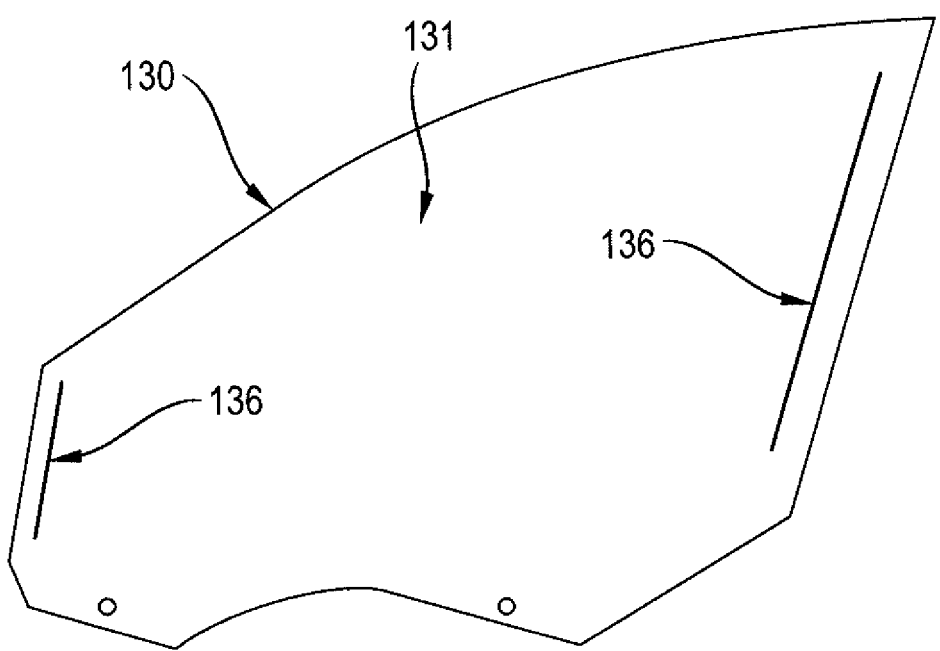
FIG. 3 depicts a schematic view of an embodiment of a window pane.

Referring now to FIG. 1 and FIG. 2, the vehicle door 20 comprises a window pane 130. The window pane 130 is partially arranged within the front pillar 21 and the rear pillar 22 in order to guide the window pane 130, when opening or closing. The window pane 130 comprises a window section 131 which is usually transparent. The term transparent shall be construed to include a configuration wherein the window section 131 serves as a protection against sunlight. As seen in more detail in FIG. 3, the window pane 130 includes a guiding section 136 which allows to guide the window pane 130, when opening or closing.

Figure 4:
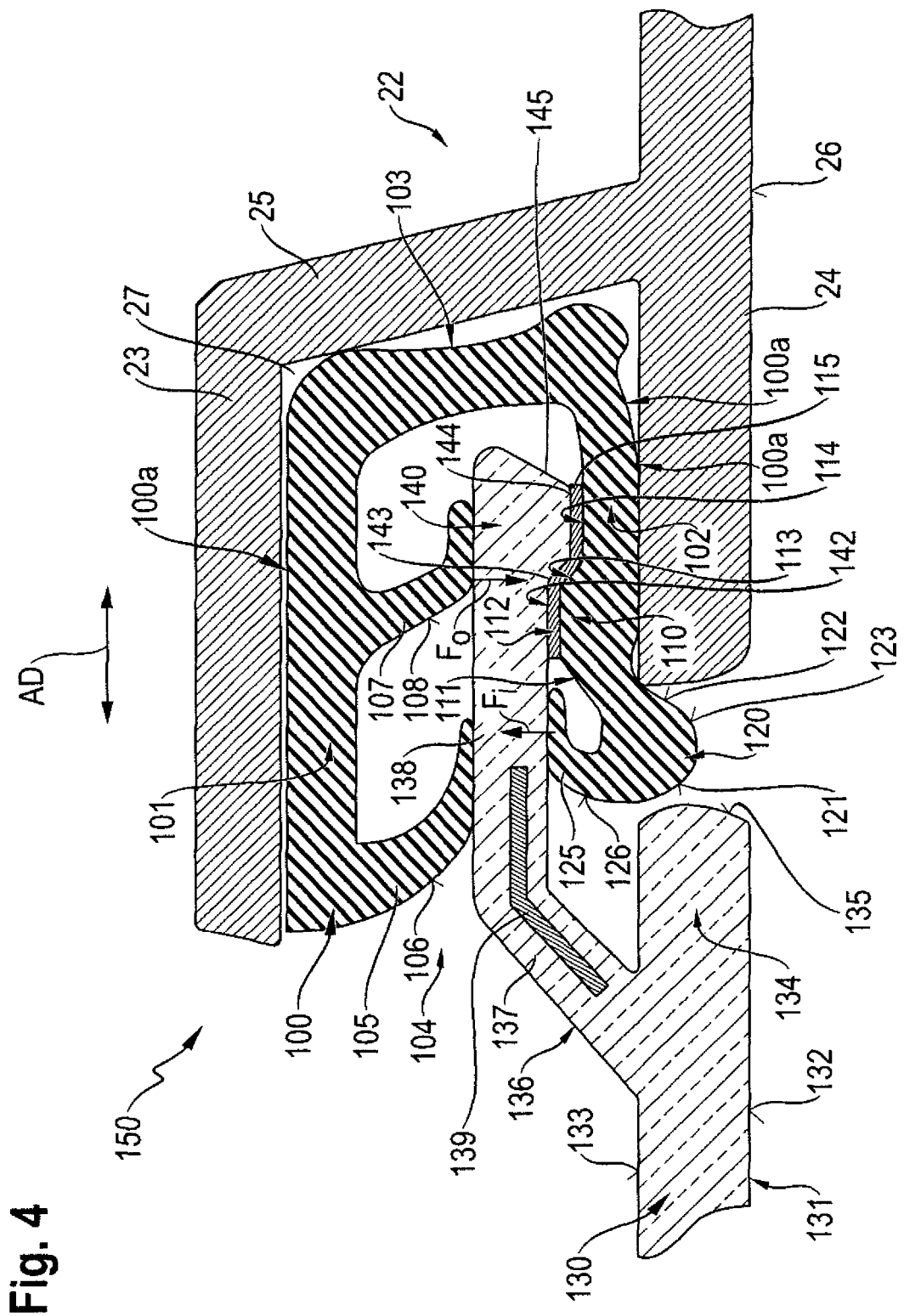
FIG. 4 depicts a cross-section of a first embodiment of a window assembly along IV-IV of FIG. 1.

Referring now to FIG. 4, a first embodiment of a window assembly 150 will be described with reference to the rear pillar 22 serving as the door frame member. It should be noted, that in the first embodiment and all subsequently described embodiments, the front pillar 21 may additionally or alternatively serve as the door frame member.

The window assembly 150 includes a rear pillar 22. The rear pillar 22 comprises an inner mounting leg 23, an outer mounting leg 24, and a mounting base 25 which has an outer surface 26. The mounting base 25 connects the inner mounting leg 23 to the outer mounting leg 24. Thereby, a mounting opening 27 is defined. The inner mounting leg 23, the outer mounting leg 24, and the mounting base 25 are arranged in a substantially U-like shape.

The window assembly 150 comprises a window guiding profile 100 and a window pane 130. The window guiding profile 100 is configured to guide the window pane 130 along a direction of movement between an open position and a closed position. The window guiding profile 100 comprises a fastening portion 100a, an inner guiding leg 101, an outer guiding leg 102, and a guiding base 103. The fastening portion 100a is disposed at the inner guiding leg 101 and the outer guiding leg 102. The inner guiding leg 101 and the outer guiding leg 102 are an example for a guiding leg, respectively. The guiding base 103 connects the inner guiding leg 101 to the outer guiding leg 102. The inner guiding leg 101, the outer guiding leg 102, and the guiding base 103 define an accommodating opening 104. The accommodating opening 104 extends along an accommodating direction AD which is parallel to the front-rear direction FR. The accommodating opening 104 has a roughly rectangular cross-section.

The inner guiding leg 101 comprises a sealing lip 105 and a pressing lip 107. The outer guiding leg 102 comprises a locating protrusion 110 and an intermediate sealing member 120. The sealing lip 105, the pressing lip 107, and the intermediate sealing member 120 are an example for a sealing portion, respectively. The sealing lip 105 protrudes from the free end of the inner guiding leg 101, into the accommodating opening 104, and towards the guiding base 103. The sealing lip 105 includes a sealing surface 106 configured to seal against moisture and/or noise. The sealing surface 106 is coated with lubricant varnish. The sealing surface 106 is an example for a contact surface. The pressing lip 107 is interposed between the sealing lip 105 and the guiding base 103. The pressing lip 107 protrudes from the inner guiding leg 101, into the accommodating opening 104, and substantially towards the locating protrusion 110. The pressing lip 107 is disposed roughly opposite the locating protrusion 110. The pressing lip 107 comprises a pressing surface 108 configured to seal against moisture and/or noise. The pressing surface 108 is coated with lubricant varnish. The pressing surface 108 is an example for a contact surface.

The locating protrusion 110 is an example for a locating means and configured to form-fittingly engage the window pane 130. The locating protrusion 110 is interposed between the intermediate sealing member 120 and the guiding base 103. The locating protrusion 110 protrudes from the outer guiding leg 100 into the accommodating opening 104 and towards the pressing lip 107. Thus, the locating protrusion 110 is facing the pressing lip 107. The locating protrusion 110 consists of a front sloped member 111, a plateau member 112, a rear sloped member 113, a recessed member 114, and a sliding surface 115. The front sloped member 111 begins adjacent to the intermediate sealing member 120 and proceeds with an angle between 30° and 60°, preferably smaller than 45°, relative to the accommodating direction AD towards the guiding base 103. Subsequently, the front sloped member 111 transitions into the plateau member 112 which proceeds roughly parallel relative to the accommodating direction AD and towards the guiding base 103. Subsequently, the plateau member 112 transitions into the rear sloped member 113 which proceeds within angle between 30° and 60°, preferably about 45°, back towards the outer guiding leg 102. Subsequently, the rear sloped member 113 transitions into the recessed member 114 which proceeds roughly parallel relative to the accommodating direction AD and is disposed outward relative to the plateau member 112. The sliding surface 115 extends from the plateau member 112 via the rear sloped member 113 to the recessed member 114 and is coated with flock.

The intermediate sealing member 120 is disposed at the end of the second guiding leg 102 and adjacent to the locating protrusion 110. The intermediate sealing member 120 includes a front contact surface 121, a rear contact surface 122, and an exposed surface 123. The front contact surface 121 and the rear contact surface 122 are an example for a contact surface, respectively. The exposed surface 123 is facing outward and interposed between the front contact surface 121 and the rear contact surface 122. A counter-pressing lip 125, which is also an example for a sealing portion, protrudes from the intermediate sealing member 120 into the accommodating opening 104 and towards the pressing lip 107. The counter-pressing lip 125 comprises a counter-pressing surface 126 configured for sealing against moisture and/or noise. The counter-pressing surface 126 is coated with a lubricating varnish. The counter-pressing surface 126 is an example for a contact surface.

Referring now to FIGS. 1 to 4, the window pane 130 comprises window section 131 and a guiding section 136. The window section 131 and the guiding section 136 are integrally formed as a single unitary member. The window section 131 is substantially transparent. The window section 131 comprises an outer window surface 132, an inner window surface 133, and an end portion 134 including an end face 135. The end portion 134 protrudes toward the rear.

The guiding section 136 comprises a connecting arm 132, a guiding arm 138, a reinforcing member 139, and a guiding protrusion 140. The connecting arm 132 protrudes away from the window section 131 on the side of the inner window surface 133 with an angle between 30° and 60°, preferably smaller than 45°, and generally in the same direction as the end portion 134. The connecting arm 137 subsequently transitions into the guiding arm 138 which extends substantially in parallel to the window section 131. The reinforcing member 139 is embedded in the connecting arm 137 and the guiding arm 138 and made of metal, for example steel or aluminium.

The guiding protrusion 140 is an example for a guiding means. The guiding protrusion 140 protrudes from the free end of the guiding arm 138 and outward. The guiding protrusion 140 consists of a recessed part 142, a front sloped part 143, a plateau part 144, and a rear sloped part 145. Beginning at the end, the rear sloped part 145 proceeds outward at an angle between 30° and 60°, preferably above 45°, relative to the outer window surface 132. Subsequently the rear sloped part 145 transitions into the plateau part 144 which proceeds roughly parallel to the outer window surface 132. Then, the plateau part 134 transitions into the front sloped part 143 which proceeds inward with an angle between 30° and 60°, preferably about 45°, relative to the outer window surface 132. Finally, the front sloped part 143 transitions into the recessed part 142 which proceeds roughly parallel relative to the outer window surface 132 and is disposed inward relative to the plateau part 144.

Referring now to FIG. 4, the assembled state of the window assembly 150 is described. The window guiding profile 100 is fastened to the rear pillar 22. The fastening portion 100a forms a force-fitting connection with the inner mounting leg 23 and the outer mounting leg 24. The accommodating opening 104 accommodates the guiding arm 138. The locating protrusion 110 and the guiding protrusion 140 form-fittingly engage each other. The sliding surface 115 is interposed between the locating protrusion 110 and the guiding protrusion 140. The plateau member 112 contacts the recessed part 142, the rear sloped member 113 contacts to the front sloped part 143, and the recessed member 114 contacts the plateau part 144. The front contact surface 121 contacts the end face 135. The rear contact surface 122 contacts the outer mounting leg 24. The sealing lip 105 and the pressing lip 107 contact the guiding arm 138. The pressing lip 107 applies an outward directed force $F_O$ to the guiding arm 138, thus pushing the guiding arm 238 towards the locating protrusion 110. The counter-pressing lip 125 applies and inward directed force $F_I$ to the guiding arm 138. Since the pressing lip 107 and the counter-pressing lip 125 are spaced apart along the accommodating direction AD, a torque is generated which further pushes the guiding protrusion 140 towards the locating protrusion 110. The outer surface 26 and the outer window surface 132 are flush, whereas the exposed surface 123 is recessed relative to the outer surface 26 and the outer window surface 132, respectively.

Figure 5:
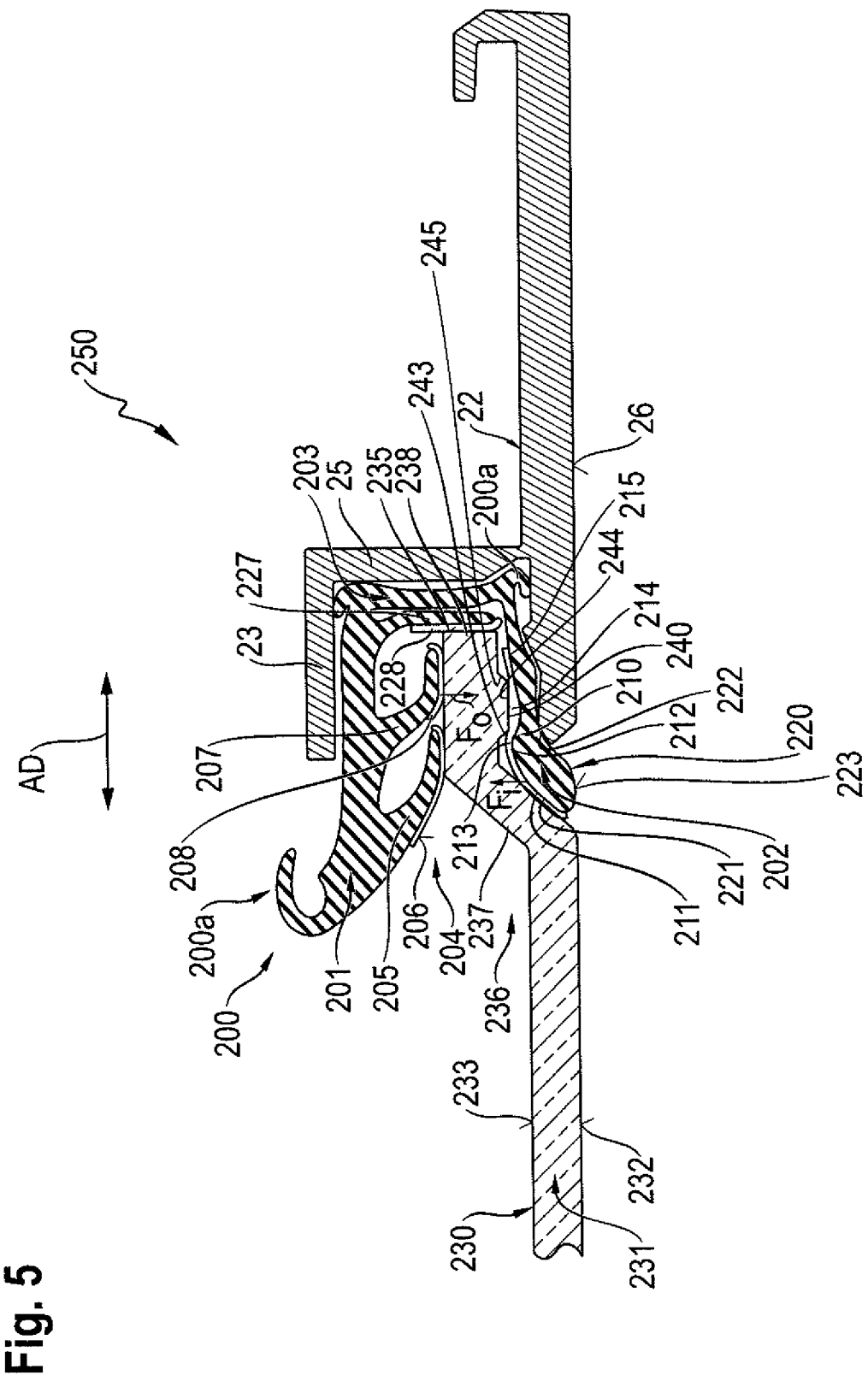
FIG. 5 depicts a cross-section of a second embodiment of window assembly.

For the sake of brevity, further embodiments of the window assembly and its components are described only insofar, as they differ from the first embodiment. Referring now to FIG. 5, a second embodiment of a window assembly 250 comprises the rear pillar 22, a window guiding profile 200, and a window pane 230. The window guiding profile 200 is fastened to the rear pillar 22. The window guiding profile 200 comprises a fastening portion 200a, an inner guiding leg 201, an outer guiding leg 202, and a guiding base 203. The fastening portion 200a takes the shape of hook-like members or protrusions and is disposed at the inner guiding leg 201, the outer guiding leg 202, and the guiding base 203. The inner guiding leg 201 and the outer guiding leg 202 are an example for a guiding leg, respectively. The inner guiding leg 201 the outer guiding leg 202, and the guiding base 203 define an accommodating opening 204. The accommodating opening 204 extends along an accommodating direction AD which is parallel to the front-rear direction FR. The accommodating opening 204 has a roughly rectangular cross-section.

The inner guiding leg 201 comprises a sealing lip 205, a pressing lip 207, and a bottom lip 227. The outer guiding leg 202 comprises a locating protrusion 210 and an intermediate sealing member 220. The sealing lip 205, the pressing Up 207, the bottom lip 227, and the intermediate sealing member 220 are an example for a sealing portion, respectively. The sealing lip 205 includes a sealing surface 206 configured to seal against moisture and/or noise. The sealing surface 206 is coated with flock. The pressing lip 207 is interposed between the sealing lip 205 and the bottom lip 227. The pressing lip 207, protrudes from the inner guiding leg 201, into the accommodating opening 204, and substantially towards the guiding base 203. The pressing lip 207 is disposed roughly opposite the locating protrusion 210. The pressing lip 207 comprises a pressing surface 208 configured to seal against moisture and/or noise. The pressing surface 208 is coated with flock. The pressing surface 208 is an example for a contact surface.

The locating protrusion 210 is an example for a locating means and configured to form-fittingly engage the window pane 230. The locating protrusion 210 is interposed between the intermediate sealing member 220 and the guiding base 203 and protrudes from the outer guiding leg 202 into the accommodating opening 204 and towards the inner guiding leg 201. Thus, the locating protrusion 210 is facing the pressing lip 207. The locating protrusion 210 consists of a front sloped member 211, a bulge member 212, a rear sloped member 213, a recessed member 214, and a sliding surface 215. The front sloped member 211 begins adjacent to the intermediate sealing member 220 and proceeds with an angle between 30° and 60°, preferably smaller than 45°, relative to the accommodating direction AD towards the guiding base 203. Subsequently, the front sloped member 211 transitions into the bulge member 212 which bulges into the accommodating opening 204. The bulge member 212 is shaped with a (half-)circular or (half-)ellipse-like contour. Subsequently, the bulge member 212 transitions into the rear sloped member 213 which bends back towards the outer guiding leg 202. Subsequently, the rear sloped member 213 transitions into the recessed member 214 which proceeds roughly parallel relative to the accommodating direction AD and is disposed outward relative to the bulge member 212. The sliding surface 215 extends from the front sloped member 211 via the plateau member 212 and the rear sloped member 213 to the recessed member 214 and is coated with flock.

The intermediate sealing member 220 is disposed at the end of the second guiding leg 202 and adjacent to the locating protrusion 210. The intermediate sealing member 220 includes a front contact surface 221, a rear contact surface 222, and an exposed surface 223. The front contact surface 221 is configured to contact the window pane 230, whereas the rear contact surface 222 is configured to contact the rear pillar 22. The front contact surface 221 and the rear contact surface 222 are an example for a contact surface, respectively. The exposed surface 223 is facing outward. The exposed surface 223 is interposed between the front contact surface 221 and the rear contact surface 223.

Referring now to FIG. 5, the window pane 230 comprises a window section 231 and a guiding section 236. The window section 231 and the guiding section 236 are integrally formed as a single unitary member. The window section 231 is substantially transparent. The window section 231 comprises an outer window surface 232, an inner window surface 233, and an end face 235. The end face 235 is configured to contact the bottom lip 227.

The guiding section 236 comprises a connecting arm 232, a guiding arm 238, and a guiding protrusion 240. The connecting arm 232 protrudes from the window section 231 on side of the inner window surface 233 with an angle between 30° and 60°, preferably smaller than or roughly 45°, towards the rear. The connecting arm 237 subsequently transitions into the guiding arm 238 which extends substantially in parallel to the window section 231. The end face 235 is disposed at the end of the guiding arm 238.

The guiding protrusion 240 is an example for a guiding means and configured to form-fittingly engage the locating protrusion 210. The guiding protrusion 240 protrudes roughly at the center of the guiding arm 238 and outward. The guiding protrusion 240 consists of a front sloped part 243, a plateau part 244, and a rear sloped part 245. The front sloped part 243 proceeds outward at an angle between 30° and 60°, preferably above 45°, relative to the outer window surface 232. Subsequently the front sloped part 243 transitions into the plateau part 244 which proceeds roughly parallel to the outer window surface 232. Then, the plateau part 234 transitions into the rear sloped part 245 which proceeds inward with an angle of roughly 45° relative to the outer window surface 232.

Still referring to FIG. 5, the assembled state of the window assembly 250 is described. The fastening portion 200a forms a combination of form-fitting and force-fitting connections with the inner mounting leg 23, the outer mounting leg 24, and the mounting base 25. The accommodating opening 204 accommodates the guiding arm 238. The locating protrusion 210 and the guiding protrusion 240 form-fittingly engage each other. The sliding surface 215 is interposed between the locating protrusion 210 and the guiding protrusion 240. The front sloped member 211 contacts the connecting arm 237, the bulge member 212 contacts the guiding arm 238, the rear sloped member 213 contacts to the front sloped part 243, and the recessed member 214 contacts the plateau part 244. The front contact surface 221 contacts the guiding arm 237. The rear contact surface 222 contacts the outer mounting leg 24. The sealing lip 205 and the pressing lip 207 contact the guiding arm 238. The bottom lip 227 contacts the end face 235. The pressing lip 207 applies an outward directed force $F_O$ to the guiding arm 238, thus pushing the guiding arm 238 towards the locating protrusion 110. The intermediate sealing member 220 applies an inward directed force $F_I$ to the connecting arm 237. Since the pressing lip 207 and the intermediate sealing member 220 are spaced apart along the accommodating direction AD, a torque is generated which further pushes the guiding protrusion 240 towards the locating protrusion 210. The outer surface 26, the exposed surface 223, and the outer window surface 232 are flush.

Figure 6:
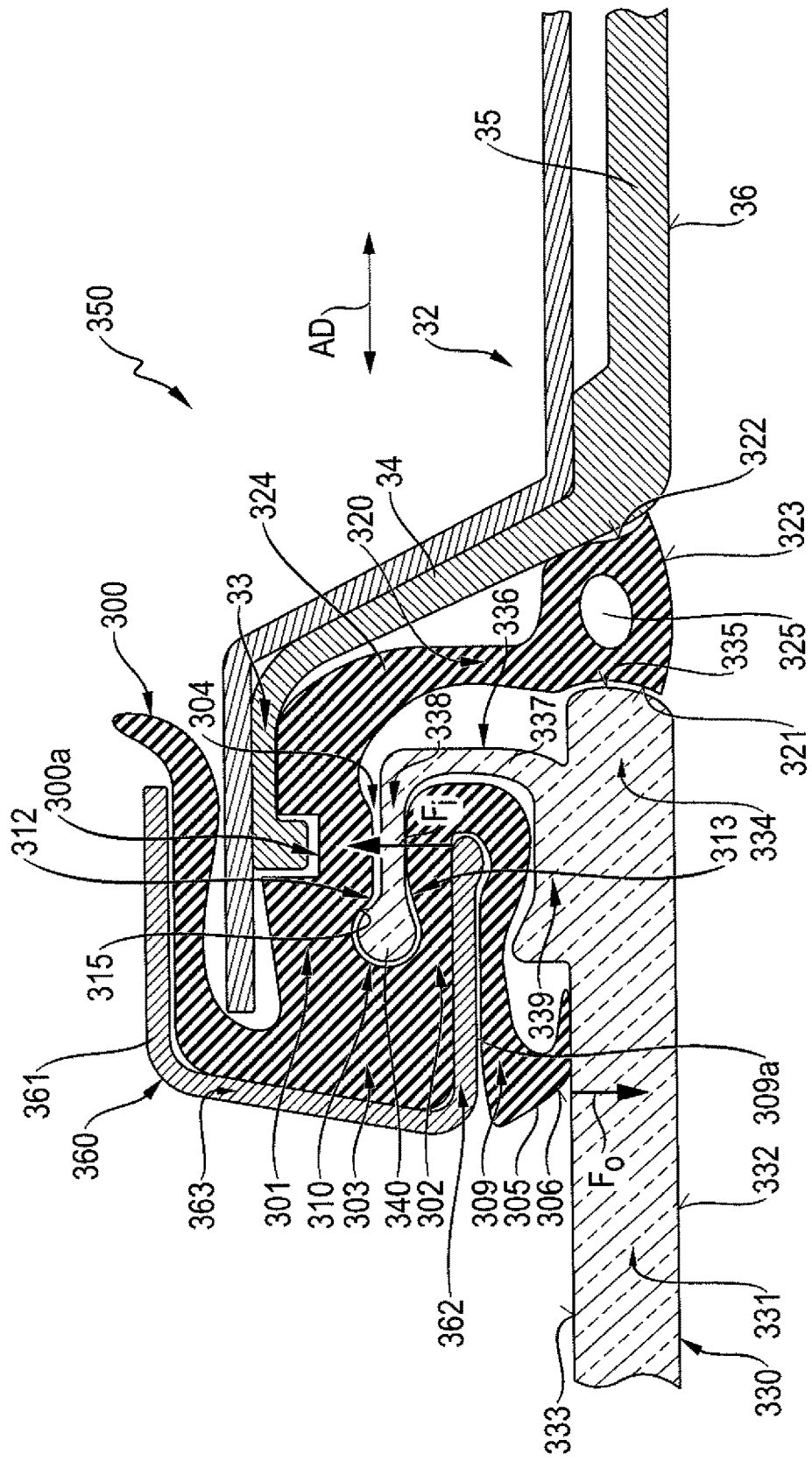
FIG. 6 depicts a cross-section of a third embodiment of a window assembly.

Referring now to FIG. 6, a third embodiment of a window assembly 350 comprises a rear pillar 32, window guiding profile 300, and a window pane 330. The rear pillar 32 comprises an inner mounting leg 33, a base leg 34, and an outer leg 35 having an outer surface 36. The mounting leg 33 has provided at its end a mounting protrusion 37. The base leg 34 connects the mounting leg 23 to the outer leg 34. The mounting leg 33, the outer leg 34, and the base leg 35 are arranged step-like.

The window guiding profile 300 comprises a fastening portion 300a, an inner guiding leg 301, an outer guiding leg 302, and a guiding base 303. The fastening portion 200a takes the shape of a notch, a channel, or a furrow. The fastening portion 300a is disposed at the inner guiding leg 301. The inner guiding leg 301 and the outer guiding leg 302 are an example for a guiding leg, respectively. The inner guiding leg 301, the outer guiding leg 302, and the guiding base 303 define an accommodating opening 304. The accommodating opening 304 extends along an accommodating direction AD which is parallel to the front-rear direction FR. The accommodating opening 304 has a roughly rectangular cross-section with a circularly shaped, elliptically shaped, or similarly shaped end.

The inner guiding leg 302 and the outer guiding leg 302 comprise a locating channel 310. The inner guiding leg 302 has connected to its end an intermediate sealing member 320 via an intermediate connecting arm 324. The intermediate connecting arm 324 begins roughly at the fastening portion 300a and bends outward towards the intermediate sealing member 320. The outer guiding leg 302 has connected to its end a bracket leg 309 which proceeds back in the opposite direction relative to the guiding leg 302. The outer guiding leg 302 and the bracket leg 309 thus define a receiving opening 309a. The receiving opening 309a extends opposite relative to the accommodating opening 304. The bracket leg 309 is provided at its end with a sealing lip 305 which extends outward. The sealing lip 305 is an example for a sealing portion. The sealing lip 305 includes a sealing surface 306 configured to seal against moisture and/or noise. The sealing surface 306 is coated with lubricant varnish.

The locating channel 310 is an example for a locating means and configured to form-fittingly engage the window pane 330. The locating channel 310 is interposed between the guiding base 303 and the intermediate sealing member 320. The locating channel 310 comprises an inner locating member 312, an outer locating member 313, and a sliding surface 315. The inner locating member 312 has a contour composed of a half-circle open towards the outer side with an edge in order to form-fittingly engage the window pane 330. The outer locating member 313 has the same shape with the half-circle open towards the inner side. The inner locating member 312 and the outer locating member 313 are disposed that the half-circles connect and the edges are opposite each other. The sliding surface 315 is disposed on the inner locating member 312 and the outer locating member 313. The sliding surface 315 is coated with lubricant varnish.

The intermediate sealing member 320 is disposed at the end of the intermediate connecting arm 324. The intermediate sealing member 320 includes a front contact surface 321, a rear contact surface 322, and an exposed surface 323. The intermediate sealing member 320 is formed as a hollow profile seal and further includes a cavity 325 which is circumferentially surrounded by the front contact surface 321, the rear contact surface 322, and the exposed surface 323. The front contact surface 321 is configured to contact the window pane 330, whereas the rear contact surface 322 is configured to contact the rear pillar 32. The front contact surface 321 and the rear contact surface 322 are an example for a contact surface, respectively. The exposed surface 323 is facing outward. The exposed surface 323 is interposed between the front contact surface 321 and the rear contact surface 323.

Referring to FIG. 6, the window pane 330 comprises a window section 331 and a guiding section 336. The window section 331 and the guiding section 336 are integrally formed as a single unitary member. The window section 331 is substantially transparent. The window section 331 comprises an outer window surface 332, an inner window surface 333, and an end portion 334 including an end face 335. The end face 335 is configured to contact the intermediate sealing member 320.

The guiding section 336 comprises a connecting arm 332, a guiding arm 338, a supporting portion 339, and a guiding member 340. The supporting portion 339 is disposed on the side of the inner window surface 333 and has a step-like shape. The connecting arm 332 is disposed adjacent the end portion 334 and protrudes from the supporting portion 339, roughly orthogonal to the window section 331, and inward. The connecting arm 337 subsequently transitions into the guiding arm 338 which extends substantially in parallel to the window section 331. The guiding member 340 is disposed at the end of the guiding arm 338 and roughly takes the cross-sectional shape of a circle or ellipsoid and the like.

The window assembly 300 further comprises a mounting bracket 360. The mounting bracket 360 is made of a thermoplastic or a metal, such as steel or aluminium. The mounting bracket 360 may thus serve as a trimming portion. The mounting bracket 360 includes a fastening limb 361, a reinforcing limb 362, and an intermediate limb 363. The fastening limb 361, the reinforcing limb 362, and the intermediate limb 363 are roughly arranged in a C-shape. The intermediate limb 363 connects the fastening limb 361 to the reinforcing limb 362.

Still referring to FIG. 6, the assembled state of the window assembly 350 is described. The window guiding profile 300 is fastened to the rear pillar 32. The fastening portion 300a forms a form-fitting connection with the mounting leg 33. The accommodating opening 304 accommodates the guiding arm 338. The locating channel 310 and the guiding member 340 form-fittingly engage each other. The sliding surface 315 is interposed between the locating channel 310 and the guiding member 340. The outer guiding leg 302 and the bracket leg 309a contact the connecting arm 337. The outer guiding leg 302 also contacts the guiding arm 338. The bracket leg 309a also contacts the supporting portion 339. The intermediate connecting arm 324 is interposed between the guiding section 336 and the rear pillar 32 The intermediate connecting arm 324 is spaced apart along the accommodating direction AD from the connecting arm 337 so that the connecting arm 337 is to the front of the intermediate connecting arm 324. The intermediate connecting arm 324 is spaced apart along the accommodating direction AD from the base leg 34 so that the base leg 34 is to the rear of the intermediate connecting arm 324.

The front contact surface 321 contacts the end face 335. The rear contact surface 322 contacts the base leg 34. The sealing lip 305 contacts the inner window surface 333. The sealing lip 305 applies an outward directed force $F_O$ to the window section 331, thus pushing the guiding arm 338 towards the outer locating member 313. The outer surface 36, the exposed surface 323, and the outer window surface 332 are flush. The mounting bracket 360 is clipped to the window guiding profile 300 by means of bending resilience. The fastening limb 361 contacts the window guiding profile 300. The reinforcing limb 362 is disposed in the receiving opening 309a. The intermediate limb 363 contacts the guiding base 303. Due to bending elasticity, the mounting bracket 360 applies an inward directed force $F_I$ to the outer guiding leg 302. The locating channel 310 is thus pressed and the form-fitting engagement of the locating channel 310 and the guiding member 340 is enhanced.

Referring now to FIG. 7, a fourth embodiment of a window assembly 450 comprises the rear pillar 32, window guiding profile 400, and a window pane 430. The window guiding profile 400 comprises a fastening portion 400a, an inner guiding leg 401, an outer guiding leg 402, and a guiding base 403. The window guiding profile 400 further comprises an intermediate sealing member 420 which is separate from the inner guiding leg 401, the outer guiding leg 402, and the guiding base 403. The fastening portion 400a takes the shape of a substantially L-shaped channel configured to form-fittingly engage the mounting leg 33. The fastening portion 400a is disposed at the inner guiding leg 401. The inner guiding leg 401 and the outer guiding leg 402 are an example for a guiding leg, respectively. The inner guiding leg 401, the outer guiding leg 402, and the guiding base 403 define an accommodating opening 404. The accommodating opening 404 extends along an accommodating direction AD which is parallel to the front-rear direction FR. The accommodating opening 404 has a roughly rectangular cross-section.

The inner guiding leg 402 and the outer guiding leg 402 comprise a locating channel 410. The outer guiding leg 402 has connected to its end a bracket leg 409 which proceeds back in the opposite direction relative to the guiding leg 402. The outer guiding leg 402 and the bracket leg 409 thus define a receiving opening 409a. The receiving opening 409a extends opposite relative to the accommodating opening 404. The bracket leg 409 is provided with a sealing lip 405 and a pressing lip 407. The sealing lip 405 is disposed at the end of the bracket leg 409 and extends outward. The pressing lip 407 is disposed between the sealing lip 405 and the intermediate sealing member 420. The sealing lip 405 and the pressing lip 407 are an example for a sealing portion, respectively. The sealing lip 405 includes a sealing surface 406 configured to seal against moisture and/or noise. The sealing surface 406 is coated with lubricant varnish. The pressing lip 407 includes a pressing surface 408 configured to seal against moisture and/or noise. The pressing surface 406 is coated with lubricant varnish.

The locating channel 410 is an example for a locating means and configured to form-fittingly engage the window pane 430. The locating channel 410 is interposed between the guiding base 403 and the intermediate sealing member 420. The locating channel 410 comprises a front member 411, an inner locating member 412, an outer locating member 413, and a sliding surface 415. The inner locating member 412 has a step-like contour with an edge in order to form-fittingly engage the window pane 430. The outer locating member 413 has the same step-like shape which is mirrored. The front member 411 connects the inner locating member 412 to the outer locating member 413. The sliding surface 415 is disposed on the front member 411, the inner locating member 412, and the outer locating member 413. The sliding surface 415 is coated with lubricant varnish.

The intermediate sealing member 420 includes a front contact surface 421, a rear contact surface 422, an exposed surface 423, a base 424, an intermediate lip 425, and a fastening means 426, such as adhesive tape. The base 424 and the intermediate lip 425 extend in parallel and spaced apart from each other. The base 424 and the intermediate lip 425 are connected at one end, whereas the other end is free.

In other words, the base 424 and the intermediate lip 425 are substantially arranged in a U-like shape. The front contact surface 421 is configured to contact the window pane 430 and is provided on the intermediate lip 425. The rear contact surface 422 is configured to contact the rear pillar 32 and is provided at the base 424. The fastening means 426 is also provided at the base 424. The front contact surface 421 and the rear contact surface 422 are an example for a contact surface, respectively. The exposed surface 423 is facing outward. The exposed surface 423 is interposed between the front contact surface 421 and the rear contact surface 423.

Referring to FIG. 7, the window pane 430 comprises a window section 431 and a guiding section 436. The window section 431 and the guiding section 436 are integrally formed as a single unitary member. The window section 431 is substantially transparent. The window section 431 comprises an outer window surface 432, an inner window surface 433, and an end portion 434 including an end face 435. The end face 435 is configured to contact the intermediate sealing member 420.

The guiding section 436 comprises a connecting arm 432, a guiding arm 438, a supporting portion 439, and a guiding member 440. The supporting portion 439 is disposed on the side of the inner window surface 433 and has a step-like shape. The connecting arm 432 is disposed adjacent the end portion 434 and protrudes from the supporting portion 439, roughly at an angle between 45° and 75°, preferably of 60°, towards the front relative to the window section 431, and inward. The connecting arm 437 subsequently transitions into the guiding arm 438 which extends substantially in parallel to the window section 431.

The guiding member 440 is integrally formed with the guiding arm 438. The guiding member 440 is provided at the end of the guiding arm 438 and has roughly rectangular cross-section. The guiding member 440 includes a front part 441, an inner lateral part 442, an outer lateral part 443, an inner rear part 444, and an outer rear part 445. The front part 441 is aligned substantially orthogonal to the outer window surface 432. Subsequently, the inner lateral part 442 is disposed inward relative to the outer lateral part 443, and extends to the rear and parallel to the outer window surface 432. The inner lateral part 443 transitions into the inner rear part 444. The inner rear part 444 is spaced apart from the front part 441 to the rear and is substantially parallel to the front part 441. Outwards, the front part 441 transitions into the outer lateral part 443 which is spaced apart from the inner lateral part 442 to the outer side and substantially parallel to the inner lateral part 442. The outer lateral part 443 subsequently transitions into the outer rear part 445 which is substantially parallel to the front part 441 and flush with the inner rear part 444.

The window assembly 400 further comprises a mounting bracket 460. The mounting bracket 460 is made of a thermoplastic or a metal, such as steel or aluminium. The mounting bracket 460 may thus serve as a trimming portion. The mounting bracket 460 includes a fastening limb 461, a reinforcing limb 462, and an intermediate limb 463. The fastening limb 461, the reinforcing limb 462, and the intermediate limb 463 are roughly arranged in a C-shape. The intermediate limb 463 connects the fastening limb 461 to the reinforcing limb 462.

Still referring to FIG. 7, the assembled state of the window assembly 450 is described. The window guiding profile 400 is fastened to the rear pillar 32. The fastening portion 400a forms a form-fitting connection with the mounting leg 33. The accommodating opening 404 accommodates the guiding arm 438. The locating channel 410 and the guiding member 440 form-fittingly engage each other. The front member 411 contacts the front part 441. The inner locating member 412 contacts the inner lateral part 442 and the inner rear part 444, thus, forming a form-fitting connection. The outer locating member 413 contacts the outer lateral part 443 and the outer rear part 445, thus, forming a form-fitting connection. The sliding surface 415 is interposed between the locating channel 410 and the guiding member 440. The outer guiding leg 402 and the bracket leg 309a contact the connecting arm 437. The outer guiding leg 402 also contacts the guiding arm 438. The bracket leg 409a also contacts the supporting portion 439. The intermediate sealing member 420 is attached to the base leg 34 by the fastening means 426. The front contact surface 421 contacts the end face 435. The rear contact surface 422 contacts the base leg 34. The sealing lip 405 and the pressing lip 407 contact the inner window surface 433. The sealing lip 405 and the pressing lip 407 cooperatively apply an outward directed force $F_O$ to the window section 431, thus pushing the guiding arm 438 towards the outer locating member 413. The outer surface 36, the exposed surface 423, and the outer window surface 432 are flush. The mounting bracket 460 is dipped to the window guiding profile 400 by means of bending resilience. The fastening limb 461 contacts the window guiding profile 400. The reinforcing limb 462 is disposed in the receiving opening 409a. The intermediate limb 463 contacts the guiding base 403. Due to bending elasticity, the mounting bracket 460 applies an inward directed force $F_I$ to the outer guiding leg 402. The locating channel 410 is thus pressed and the form-fitting engagement of the locating channel 410 and the guiding member 440 is enhanced., With the window guiding assemblies previously described, a flush transition between the window pane and the door frame member can be achieved. Using the locating means and the guiding means, a reliable guiding of the window pane during opening and closing may be ensured. An advantageous arrangement of the sealing lip, the pressing lip, the locating means, and the intermediate sealing member causes forces, which contribute to minimize the risk of the locating means and the guiding means disengaging, on the window pane.

LIST OF REFERENCE SIGNS 10 motor vehicle
11 side window opening
20 vehicle door
21 front pillar (door frame member)
22 rear pillar (door frame member)
23 inner mounting leg
24 outer mounting leg
25 mounting base
26 outer surface
27 mounting opening
32 rear pillar (door frame member)
33 mounting leg
34 base leg
35 outer leg
36 outer surface
37 mounting protrusion
100 window guiding profile
100a fastening portion
101 inner guiding leg (guiding leg)
102 outer guiding leg (guiding leg)
103 guiding base
104 accommodating opening 105 sealing lip (sealing portion)
106 sealing surface (contact surface)
107 pressing lip (sealing portion)
108 pressing surface (contact surface)
110 locating protrusion (locating means)
111 front sloped member
112 plateau member
113 rear sloped member
114 recessed member
115 sliding surface (contact surface)
120 intermediate sealing member (sealing portion)
121 front contact surface (contact surface)
122 rear contact surface (contact surface)
123 exposed surface
125 counter-pressing lip (sealing portion)
126 counter-pressing surface (contact surface)
130 window pane
131 window section
132 outer window surface
133 inner window surface
134 end portion
135 end face
136 guiding section
137 connecting arm
138 guiding arm
139 reinforcing member
140 guiding protrusion (guiding means)
142 recessed part
143 front sloped part
144 plateau part
145 rear sloped part
150 window assembly
200 window guiding profile
200a fastening portion
201 inner guiding leg (guiding leg)
202 outer guiding leg (guiding leg)
203 guiding base
204 accommodating opening
205 sealing lip (sealing portion)
206 sealing surface (contact surface)
207 pressing lip (sealing portion)
208 pressing surface (contact surface)
210 locating protrusion (locating means)
211 front sloped member
212 plateau member
213 rear sloped member
214 recessed member
215 sliding surface (contact surface)
220 intermediate sealing member (sealing portion)
221 front contact surface (contact surface)
222 rear contact surface (contact surface)
223 exposed surface
227 bottom lip (sealing portion)
228 bottom surface (contact surface)
230 window pane
231 window section
232 outer window surface
233 inner window surface
235 end face
236 guiding section
237 connecting arm
238 guiding arm
240 guiding protrusion (guiding means)
243 front sloped part
244 plateau part
245 rear sloped part
250 window assembly
300 window guiding profile
300a fastening portion
301 inner guiding leg (guiding leg)
302 outer guiding leg (guiding leg)
303 guiding base
304 accommodating opening
305 sealing lip (sealing portion)
306 sealing surface (contact surface)
309 bracket leg
309a receiving opening
310 locating channel (locating means)
312 inner locating member
313 outer locating member
315 sliding surface (contact surface)
320 intermediate sealing member (sealing portion)
321 front contact surface (contact surface)
322 rear contact surface (contact surface)
323 exposed surface
324 intermediate connecting arm (sealing portion)
325 cavity
330 window pane
331 window section
332 outer window surface
333 inner window surface
334 end portion
335 end face
336 guiding section
337 connecting arm
338 guiding arm
339 supporting portion
340 guiding member (guiding means)
350 window assembly
360 mounting bracket (trimming portion)
361 fastening limb
362 reinforcing limb
363 intermediate limb
400 window guiding profile
400a fastening portion
401 inner guiding leg (guiding leg)
402 outer guiding leg (guiding leg)
403 guiding base
404 accommodating opening
405 sealing lip (sealing portion)
406 sealing surface (contact surface)
407 pressing lip (sealing portion)
408 pressing surface (contact surface)
409 bracket leg
409a receiving opening
410 locating channel (locating means)
411 front member
412 inner locating member
413 outer locating member
415 sliding surface (contact surface)
420 intermediate sealing member (sealing portion)
421 front contact surface (contact surface)
422 rear contact surface (contact surface)
423 exposed surface
424 base
425 intermediate lip
426 fastening means
430 window pane
431 window section
432 outer window surface
433 inner window surface
434 end portion
435 end face
436 guiding section 437 connecting arm
438 guiding arm
439 supporting portion
440 guiding member (guiding means)
441 front part
442 inner lateral part
443 outer lateral part
444 inner rear part
445 outer rear part
450 window assembly
460 mounting bracket (trimming portion)
461 fastening limb
462 reinforcing limb
463 intermediate limb
AD accommodating direction
FR front-rear direction
$F_I$ inward directed force
$F_O$ outward directed force

The invention claimed is:

1. Window assembly for a window opening of a motor vehicle having a front-rear direction, comprising:
   a door frame member having an outer surface;
   a movable window pane having an outer window surface and a guiding member; and
   a window guiding profile fastened to the door frame member, and being configured to guide the window pane along a direction of movement between an open position and a closed position, the window guiding profile including:
   a fastening portion being configured to fasten the window guiding profile to the door frame member,
   a sealing portion being configured to seal the window pane,
   an accommodating opening being configured to accommodate the window pane and extending in an accommodating direction being parallel to the front-rear direction,
   an inner guiding leg, an outer guiding leg comprising a locating channel, and a guiding base connecting the inner guiding leg and the outer guiding leg;
   wherein the guiding member and the locating channel cooperate to prevent a movement of the window pane out of the accommodating opening along the accommodating direction,
   wherein the outer guiding leg comprises a bracket leg defining a receiving opening extending in an opposite direction relative to the accommodating opening,
   characterized by a mounting bracket fastened to the window guiding profile, the mounting bracket being configured to reinforce the outer guiding leg.

2. Window assembly according to claim 1, wherein the window guiding profile is contacting and accommodating the window pane in such a way, that the outer surface and the outer window surface are arranged to be flush.

3. Window assembly according to claim 1, wherein the sealing portion engages the window pane so as to press the window pane towards the locating channel.

4. Window assembly according to claim 1, wherein the sealing portion is configured to apply a torque to the window pane so as to press the window pane towards the locating channel.

5. Window assembly according to claim 1, wherein the sealing portion further comprises at least one of the following features:
   a sealing lip being disposed at the outer guiding leg, extending into the accommodating opening or protruding outward from the outer guiding leg;
   a pressing lip being disposed at the outer guiding leg, extending into the accommodating opening and towards the locating channel or protruding outward from the outer guiding leg and away from the locating channel;
   an intermediate sealing member being disposed at the end of the inner guiding leg, and being spaced apart from the pressing lip along the accommodating direction;
   an intermediate sealing member being interposed along the accommodating direction between the locating channel and the door frame member, and being spaced apart from the locating channel along the accommodating direction.

6. Window assembly according to claim 5, wherein the intermediate sealing member comprises a front contact surface, a rear contact surface, and an exposed surface interposed along the accommodating direction between the front contact surface and the rear contact surface, and
   wherein the exposed surface is arranged to be recessed or to be flush with the outer surface and the outer window surface.

7. Window assembly according to claim 5, wherein the locating channel is disposed so as to face the pressing lip, or is disposed adjacent to the intermediate sealing member along the accommodating direction.

8. Window assembly according to claim 5, wherein the locating channel is interposed along the accommodating direction between the guiding base and the intermediate sealing member.

9. Window assembly according to claim 1, wherein the window pane comprises a window section and a guiding section which are integrally formed as a single unitary member, and the guiding member is disposed at the end of the guiding section.

10. Window assembly according to claim 9, wherein the guiding section includes a supporting portion.

11. Window assembly according to claim 1, wherein the window guiding profile is formed as a single unitary member.

12. Window assembly according to claim 11, wherein the window guiding profile is formed from a thermoplastic elastomer or from an elastomer.

13. Window guiding profile of the window assembly according to claim 1, the window guiding profile being configured to guide the window pane along the direction of movement between the open position and the closed position and comprising:
    the fastening portion being configured to fasten the window guiding profile to the door frame member;
    the sealing portion being configured to seal the window pane;
    the inner guiding leg, the outer guiding leg comprising the locating channel, and the guiding base connecting the inner guiding leg and the outer guiding leg;
    the accommodating opening being configured to accommodate the window pane and extending in the accommodating direction being parallel to the guiding legs;
    wherein the locating channel is configured to cooperate with the window pane so as to prevent a movement of the window pane out of the accommodating opening along the accommodating direction,
    wherein the outer guiding leg comprises the bracket leg defining the receiving opening extending in the opposite direction relative to the accommodating opening, characterized by the mounting bracket fastened to the window guiding profile, the mounting bracket being configured to reinforce the outer guiding leg.

\* \* \* \* \*